United States Patent [19]

Hanauer et al.

[11] Patent Number: 4,742,039
[45] Date of Patent: May 3, 1988

[54] ADSORBENTS BASED ON PHYLLOSILICIC ACIDS WHICH HAVE BEEN MODIFIED SO AS TO BE ORGANOPHILIC

[75] Inventors: Johann F. Hanauer, Eppstein; Hans-Peter Rieck, Hofheim am Taunus; Hans-Jürgen Kalz, Liederbach; Jochen M. Quack, Eppstein; Armin Weiss, Munich, all of Fed. Rep. of Germany

[73] Assignee: Hoechst Aktiengesellschaft, Frankfurt am Main, Fed. Rep. of Germany

[21] Appl. No.: 778,567

[22] Filed: Sep. 20, 1985

[30] Foreign Application Priority Data

Sep. 21, 1984 [DE] Fed. Rep. of Germany ....... 3434709

[51] Int. Cl.⁴ .............................................. B01J 20/22
[52] U.S. Cl. ................. 502/407; 252/174.15
[58] Field of Search ................. 502/62, 158, 164, 401, 502/402, 407; 252/174.15

[56] References Cited

U.S. PATENT DOCUMENTS 3,929,849  12/1975  Oswald ............................. 502/62 X
4,104,294  8/1978  Grose et al. ..................... 502/164 X
4,578,258  3/1986  Rieck ................................. 423/326

FOREIGN PATENT DOCUMENTS 0076572  4/1983  European Pat. Off. .

Primary Examiner—Carl F. Dees

[57] ABSTRACT

Adsorbents for polar organic compounds can be prepared by reacting 5-80% of an organic ammonium compound with 20-95% of a crystalline alkali metal phyllosilicate belonging to the group comprising phyllosilicates of the formula $$Me_2Si_xO_{2x+1} \cdot yH_2O$$

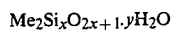

in which Me denotes an alkali metal ion or a proton, x denotes a number greater than 7, in particular from 7.5 to 23, and y denotes a number smaller than 7x. These organophilic phyllosilicic acids are capable of binding considerable amounts of organic compounds, such as, for example, fats or softeners. They are, therefore, excellently suitable for use as additives for enhancing the washing action in detergents or as a depot for organic compounds.

9 Claims, No Drawings

ADSORBENTS BASED ON PHYLLOSILICIC ACIDS WHICH HAVE BEEN MODIFIED SO AS TO BE ORGANOPHILIC

Organophilic phyllosilicates can be prepared by reacting naturally occurring phyllosilicates, such as, for example, montmorillonite, with quaternary ammonium compounds. Products based on quaternary ammonium compounds having fairly long chains and bentonite are widely used as rheology-influencing additives for paint systems. The swellability of the organo-phyllosilicate in organic solvents is an important factor in this connection.

Furthermore, phyllosilicates in combination with quaternary ammonium compounds and tertiary amines are described in European Pat. No. 0,076,572 for use in detergent formulations. These additives are stated to reduce the undesirable stiffening of handle of the washed goods after the washing process.

Phyllosilicate complexes of glycerides, lecithins and phytol derivatives are also described in the literature, naturally occurring, mica-like phyllosilicates of an average and low layer charge being used (G. Dischinger, Dissertation, Munich 1983).

It has now been found that certain crystalline alkali metal phyllosilicates which are modified by organic quaternary ammonium compounds constitute excellent adsorbents for organic compounds.

The invention relates to adsorbents for organic compounds based on phyllosilicic acids which have been modified so as to be organophilic. These adsorbents are described in the text which follows as organo-PSA and are prepared from (a) 5–80%, preferably 10–50%, of a quaternary ammonium compound of the formulae I–IV

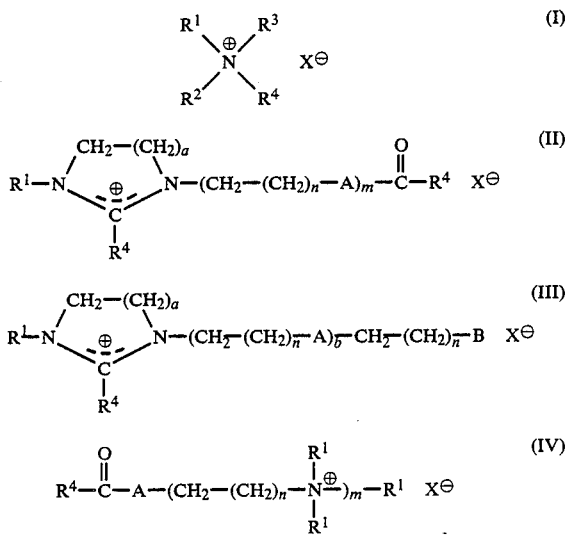

in which $R^1$ and $R^2$ can be identical or different and denote hydrogen, $C_1$–$C_4$-alkyl, $C_2$–$C_4$-hydroxyalkyl or benzyl, $R^3$ denotes hydrogen, $C_1$–$C_{22}$-alkyl or $C_1$–$C_{22}$-alkenyl, preferably $C_6$–$C_{22}$-alkyl or $C_6$–$C_{22}$-alkenyl, $C_2$–$C_4$-hydroxyalkyl or benzyl, $R^4$ denotes $C_1$–$C_{22}$-alkyl, preferably $C_6$–$C_{22}$-alkyl, $C_6$–$C_{22}$-alkenyl, $C_4$–$C_{22}$-alkoxyalkyl or $C_4$–$C_{22}$-alkyl phenoxyethyl, a denotes 1 or 2, b denotes a number from 0 to 3, n or m denote a number from 1 to 4, A denotes NH or O, B denotes $NH_2$, $N(R^1)_2$, $N^{\oplus}(R^1)_3{}^{4-}$ or OH and $X^-$ denotes an anion, and (b) 20–95%, preferably 50–90%, of a crystalline phyllosilicate belonging to the group comprising phyllosilicates of the formula

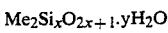

$Me_2Si_xO_{2x+1} \cdot yH_2O$ in which Me denotes an alkali metal ion or a proton, x denotes a number greater than 7, in particular from 7.5 to 23, and y denotes a number smaller than 7 x.

Compared with the smectites mentioned in many patents, to which montmorillonites and hectorites also belong, the crystalline alkali metal silicates (phyllosilicates) mentioned above have a fundamentally different molecular structure, since they contain no magnesium or aluminum—except for possible impurities in small amounts. The total MgO and $Al_2O_3$ in the silicate is, in contrast with the smectites, in every case less than 15% by weight, and is normally less than 5%, preferably less than 2%. The alkali metal silicates or the corresponding free silicic acids used in the present invention can be classed with the group of phyllosilicates. For purposes of explanation, their anhydrous composition can be described by means of the formula indicated. The alkali metal ions can be wholly or partly replaced by protons, so that, in this case, Me can represent protons or various alkali metals. Accordingly, the term alkali metal silicates also embraces, in all cases, the corresponding free silicic acids. It is preferable for Me to be sodium. The capacity for ion exchange of the crystalline alkali metal silicates used in the invention amounts to 130–400 mmol of $Me^+/100$ g of anhydrous silicate. In an X-ray diffraction pattern, the silicates have one or more reflexes in the region of d-values from 3.0 to $4.0 \times 10^{-8}$ cm, which cannot be allocated to quartz, tridymite and cristobalite.

Either natural or synthetic crystalline alkali metal silicates can be employed for the invention, such as, for example, magadiite, $Na_2Si_{14}O_{29} \times 11H_2O$, which occurs naturally, and kenyaite, $Na_2Si_{22}O_{45} \times 10H_2O$ (H. P. Eugster, Science, 157, 1177–1180 (1967) and also synthetic products of the composition $Na_2Si_8O_{17}$, $K_2Si_8O_{17}$ and $Na_2Si_{14}O_{29}$ (R. K. Iler, J. Colloid Sci., 29, 648–657 (1964); German Patent No. 2,742,912; and G. Lagaly, K. Beneke and A. Weiss, Am. Mineral., 60, 642–649 (1975). The particle size of the silicates to be used in accordance with the invention is preferably 0.1 to $50\mu$.

The synthesis of the foliated alkali metal silicates, particularly the sodium and potassium salts, is usually effected from silica gel, silica sol or precipitated silica, by adding an alkali metal hydroxide under hydrothermal conditions. Occasionally, a corresponding carbonate solution is also used instead of an alkali metal hydroxide solution. The amount of alkali depends on the product desired.

The crystalline alkali metal phyllosilicates whose preparation is described in German Patent Application No. P 34 00 132.8 are, however, particularly preferred within the scope of the present application. In this process, sufficient of an acid compound is added to an alkali metal silicate dissolved in water or an amorphous alkali metal silicate having an $M_2O/SiO_2$ molar ratio of 0.24 to 2.0, M representing an alkali metal, to give an $M_2O$ (not neutralized)/$SiO_2$ molar ratio of 0.05 to 0.239, if appropriate, the $SiO_2/H_2O$ molar ratio is adjusted to 1:5 to 1:100 by dilution, and the reaction mixture is kept at a reaction temperature of 70° to 250° C. until the alkali metal phyllosilicate has crystallized out. M preferably represents sodium and potassium.

A preferred and very reactive starting compound is soda water glass containing approx. 22 to 37% of $SiO_2$ and 5 to 18% of $Na_2O$ and less than 0.5% of $Al_2O_3$. A soda water glass containing 22–30% by weight of $SiO_2$ and 5–9% by weight of $Na_2O$ is particularly preferred. However, amorphous alkali metal silicates, in particular solid sodium and potassium silicates, which can also be anhydrous, but are at least soluble in water at the reaction temperature, can also be used.

The acid compound added can be an acid anhydride or an acid salt, such as sodium bisulfate. Free organic or inorganic acids are preferred, however. Inorganic acids, such as phosphoric acid or sulfuric acid, are particularly preferred. The amount of acid compound to be added depends on the starting silicate and the end product desired.

Nearly always the end product formed has a lower $M_2O/SiO_2$ ratio than the reaction mixture from which it is formed. The atomic ratio of alkali metal to silicon in the end products is, for instance, between 1:4 to 1:11. The pH of the product mixture after the acid compound has been added is generally above 9. It is preferable to adjust the pH to a value between 10 and 12. The reaction system becomes buffered as a result of adding the acid compound.

Pure products or mixtures of crystalline alkali metal phyllosilicates can be obtained by this process. The resulting alkali metal phyllosilicates have a capacity for ion exchange. Their X-ray diffraction patterns are similar to those of known alkali metal phyllosilicates. These alkali metal phyllosilicates can be converted into the corresponding free acid by treating them with a mineral acid, for example hydrochloric acid or sulfuric acid, it being necessary for the pH to be below 3 for complete ion exchange.

In addition to the alkali metal ions, other metal ions can also be present, in addition, in the synthesis of the alkali metal phyllosilicates, for example germanium, aluminum, indium, arsenic and antimony and also the non-metals boron and phosphorus. If the amount of these constituents, relative to the alkali metal content, is less than 10%, the synthesis is only affected to an unappreciable extent. In order to prepare a pure alkali metal phyllosilicate, or the free acid, it is advantageous to dispense with adding extraneous metals in the course of the synthesis. Pure phyllosilicates containing a cation other than an alkali metal can be readily obtained in a further stage from the alkali metal salt by ion exchange or from the corresponding free acid by neutralization. The process described can also be carried out in the presence of small amounts of organic compounds; it is preferable, however, to carry out the reaction without any organic compounds.

An $H_2O/SiO_2$ molar ratio of 8:1 to 40:1 in the starting products is preferable for the process described. A greater dilution with water is often advantageous for the preparation of phyllosilicates of low alkali metal content (Me/Si atomic ratio of 1:7 to 1:11) than for the preparation of phyllosilicates having a higher alkali metal content (Me/Si atomic ratio 1:4 to 1:7, for instance). The reaction temperature is preferably 130°–230° C., in particular 160°–210° C. Longer reaction times, high reaction temperatures and low ratios of alkali (not neutralized) to $SiO_2$ favor the formation of phyllosilicates of low alkali content. Short reaction times, low reaction temperatures and high alkali metal/Si ratios favor the formation of phyllosilicates of high alkali metal content.

The reaction time depends greatly on the reaction temperature. It can be less than 1 hour, but can also be several months. The optimum reaction time can be determined for the reaction temperature chosen by taking samples, which are subjected to X-ray examination, at different times during the reaction.

The reaction is preferably carried out with good stirring in a pressure vessel. It is very advantageous to add seed crystals, since this improves the purity of the product and shortens the reaction time. However, it is also possible to carry out the reaction without seed crystals. Possible impurities of amorphous silicates or amorphous silicates produced in this method of preparation do not interfere, since they can assume the function of builders in the detergent. The phyllosilicates described can, themselves, also act as builders.

When carrying out the reaction discontinuously, the amount of seed crystals can be up to 30% by weight, relative to the $SiO_2$ content of the alkali metal silicate which is added, dissolved in water or amorphous. Adding less than 0.01% of seed crystals no longer has any detectable effect. Instead of adding seed crystals, it can also be sufficient if small residues from a previous batch remain in the reaction vessel. When the reaction is carried out continuously, substantially higher concentrations of crystal nuclei (in the stationary equilibrium) have also proved advantageous.

The process can be carried out discontinuously, semi-continuously and continuously in equipment having tubular reactor, stirred kettle or cascade characteristics.

Various alkali metal phyllosilicates can be prepared by this process, inter alia also the silicate Na-PSA-1 and Na-PSA-2, which is used in the examples and which has an ion exchange capacity of about 140 to 157 mmol or about 215 mmol of $Na^+/100$ g of dry product (calculated relative to calcined product). The use of these products is particularly advantageous, because they contain no heavy metal ions which decompose the perborate.

As a result of the structural composition of these phyllosilicic acids, the individual layers carry negative excess charges, which are compensated by hydrogen or metal ions. Depending on the reaction conditions, these cations are at least partly exchangeable. Detailed descriptions of this reaction are to be found in the literature (Lagaly et al., Organic Complexes of Synthetic magadiite; Proc. Int. Clay Conf., Madrid 1972, p. 663–673, Madrid 1973).

The organophilic modification of the phyllosilicic acids described is effected by cation exchange, the hydrogen or metal ions being replaced by the organic cations of the quaternary ammonium compounds of the formulae indicated.

Rapid and quantitative cation exchange leading to organo-PSA is achieved when using quaternary ammonium compounds containing at least one alkyl radical having a chain length of $C_6$. The greater the chain length and the number of C chains, the steeper the characteristics of the exchange isotherms. The reaction is carried out at temperatures from 20° to 120° C., preferably at 40° to 100° C. In general, the phyllosilicic acids are used as starting materials in the form of their alkali metal salts, and the latter are reacted with the quaternary ammonium compounds of the formulae I–IV. It is also possible, however, to use the free phyllosilicic acid under otherwise identical conditions and to react this acid with the amines on which the quaternary ammonium compounds of the formulae I-IV are based and from which they differ only in the absence of the groups $R^1$ and X.

The organic cations are compounds which are known per se. The preparation is usually carried out by reacting a primary, secondary or tertiary amine with an inorganic or organic acid or by reacting the amines with known alkylating agents, such as, for example, alkyl halides, sulfuric acid esters, alkylene oxides, olefins and many others. A large number of compounds are suitable for use as amines for the preparation of the cations. The following may be mentioned without limiting the scope of the invention: monoalkylamines, dialkylamines and trialkylamines, monoalkenylamines, dialkenylamines and trialkenylamines, fatty acid derivatives of diethanolamine and polyalkylene polyamines ("amine esters", "amide-amines" and imidazolines).

The speed and completeness of the cation exchange depend primarily on the temperature and on the solubility of the quaternary ammonium compounds (QAC) and hence on the number and length of the alkyl chains. As a rule, higher temperatures favor the exchange. At a temperature of 60° C. the equilibrium is set up after only a short time, in some cases after minutes. The longer the alkyl chain, the more quantitative the cation exchange.

As a result of the higher space requirement of the organic cations, their incorporation is associated with an expansion of the layer distance. This effect can be detected in the X-ray diffraction pattern. At the same time as the incorporation of the QAC, the PSA loses its hydrophilic character of being swollen by water. The interstices of the individual layers become organophilic, i.e. organic compounds can be adsorbed into the remaining cavities by van der Waal and dipole interaction. In some cases this process is associated with an additional expansion of the layer. The extent to which the PSA is covered with QAC is a decisive factor for optimum adsorption results.

The prehistory of the organo-PSA is without influence as far as the adsorption of organic compounds is concerned. The organo-PSA can be prepared immediately before use as an aqueous dispersion, even in a fairly high dilution, from PSA and QAC, and can be used as an adsorbent. Alternatively, the organo-PSA can also be isolated without a diluent and dried or mixed with other components, if this offers technical advantages in use.

The adsorbents described can be used in all cases where the adsorption of organic compounds is required, for example in the washing process where considerable amounts of organic impurities, for example sebaceous matter, have to be removed from the goods washed and solubilized in the wash liquor. In the case of conventional modern detergents, this solubilization or emulsification of fats is mainly achieved by means of nonionic surfactants. This task can be taken over by the organo-PSA described, so that the latter can, if desired, replace part or the total amount of nonionic surfactants in the detergent formulation. In addition to nonionic surfactants, the light-duty detergent, easy-care detergent or heavy-duty detergent can contain a number of other known components, such as, for example, anionic and zwitterionic surfactants, builder substances, complex-formers, bleaching components, perborate activators, foam stabilizers, foam inhibitors, soil-suspenders, enzymes, softening amines, quaternary ammonium compounds, perfume oils, optical brighteners, fillers and many others. The formulations are described in detail in the literature (cf., for example, Schwartz, Perry and Berch, "Surface Active Agents and Detergents", Volume 11 (1958) pages 25–93, 120–130 and 238–317); Lindner, "Tenside, Textilhilfsmittel, Waschrohstoffe" ["Surfactants, Textile Auxiliaries and Detergent Bases"], Volume I, (1964), pages 561–921 and 1035–1041; and P. Bert, "Chemie und Technologie moderner Waschmittel" ["The Chemistry and Technology of Modern Detergents"], Chemikerzeitung 94, (1970), No. 23/24, page 974 et seq.). The tests also show that, not only triglycerides, but also tertiary amines, which are employed in detergents as softening compounds, become bound. Organo-PSA can, therefore, also be employed as a binder or depot for a large number of polar organic compounds.

EXAMPLES

In the examples which follow, a triglyceride (sunflower oil) was chosen as representing the numerous organic compounds which can be adsorbed on the QAC/PSA systems described. The sunflower oil employed contains polar ester groups and several unsaturated, weakly polar bonds in the alkyl radical of the fatty acids. According to Römpps Chemie Lexikon [Römpp's Chemical Dictionary], 100 g of sunflower oil contain 99.9 g of fats composed of 5.6% of palmitic fat, 2.2% of stearic acid, 0.9% of arachidic acid, 25.1% of oleic acid and 66.2% of lineoleic acid. Sunflower oil was chosen because fats, fatty acids and fatty acid esters represent the main constituent in the fatty soiling of goods to be washed. In general, any other organic compound containing at least one double bond and a C chain length greater than 2, preferably greater than 6, can be adsorbed in the manner described. Polar groups in the molecule strengthen the attachment of the substances in the organophilic phyllosilicate and thus produce more quantitative adsorption. Limits to the use described are found in the case of n-paraffins and compounds having very high steric requirements, which can only be incorporated to a slight extent, or not at all, into the organophilic phyllosilicic acids.

Liquid and highly viscous hydrocarbons, for example engine oils or lubricating greases are coagulated by the oleophilic phyllosilicic acids, i.e. are flocculated out of the aqueous dispersion.

The abbreviations used in the text have the following meanings:
QAC: quaternary ammonium compound
QAC/PSA: phyllosilicate of the type described, in which the negative layer charges caused by QAC are partly or completely compensated by the organic ammonium ion. This type is organophilic or oleophilic, i.e. is capable of adsorbing organic compounds.
Na-PSA-1: sodium salt of phyllosilicic acids PSA-1
Na-PSA-2: sodium salt of phyllosilicic acids PSA-2

The sodium salts of two different phyllosilicic acids, designated in the following text as Na-PSA-1 (kenyaite-like) and Na-PSA-2 (magadiite-like), were employed for the adsorption tests.

The Na-PSA-1 sodium silicate was prepared as follows:

A reaction mixture having the molar composition $$0.303 Na_2O : 0.0052 Al_2O_3 : SiO_2 : 30 H_2O$$

is first prepared by adding 83.5 parts by weight of soda water glass (27% of $SiO_2$, 8.43% of $Na_2O$ and 0.24% of $Al_2O_3$) to 149 parts of water. A fraction of a filter-moist, crystalline sodium silicate from a previous test is then added (71% loss in weight by heating at 1200° C.; only the water content was taken into consideration for calculating the molar composition). 4.93 parts of 96% strength sulfuric acid are then added slowly, with stirring. The reaction mixture then has the following molar composition:

$0.174Na_2O:0.0052Al_2O_3:SiO_2:0.129Na_2SO_4:30H_2O$.

The reaction mixture is heated to 205° C. in the course of 1.5 hours in a stainless steel autoclave, kept at this temperature for 2.5 hours and then slowly cooled. After cooling, the reaction mixture is filtered, and the material on the filter is washed with water and sucked dry on a suction filter. The filter-moist product has a loss on ignition of 55%. After being dried for a short time in the air, the product is subjected to thermogravimetric analysis. A loss in weight of 43% takes place up to a temperature of about 140° C. No further appreciable decrease in weight is observed up to approx. 1000° C. The product which has been dried to a constant weight at 120° C., Na-PSA-1, has the following composition in terms of elementary analysis: 3.8% of Na, 0.24% of Al, 41.5% of Si and 0.003% of Fe. An $SiO_2/Na_2O$ molar ratio of 17.9 can be calculated from these figures. The X-ray diffraction pattern of the air-dried sodium silicate (Na-PSA-1) is given in the following table.

| d ($10^{-8}$ cm) | I/Io |
|---|---|
| 20.5 | 56 |
| 10.0 | 11 |
| 7.31 | 4 |
| 4.99 | 13 |
| 3.64 | 22 |
| 3.52 | 31 |
| 3.44 | 100 |
| 3.34 | 46 |
| 3.21 | 53 |
| 2.94 | 16 |

The cation exchange capacity of Na-PSA-1 is approx. 150 mmol $Na^\oplus$/100 g, relative to calcined material.

Sodium silicate PSA-2 is prepared as follows: the product is prepared from the same starting materials as the PSA-1 sodium silicate described above. Seed crystals of a magadiite-like silicate from a previous test are added to the reaction mixture. The reaction mixture is stirred for 19 hours at 165° C. and is filtered after cooling; the material on the filter is washed with water and sucked dry on a suction filter. 10 g of the mother liquor of the reaction mixture, after dilution with 250 ml of water, have a pH of 10.4. The X-ray diffraction pattern of the product (Na-PSA-2) after being dried for a short time in the air is shown in the table below. The filter-moist product, which loses 61.3% of its weight on calcination (>1000° C.), is titrated with sulfuric acid analogously to Example 4. The titration figures are shown in a further table. When the results are plotted on a graph, an equivalence value of 215 meq/100 g of calcined product is determined from the point of inflexion of the curve at pH 5.0. For a product of the composition $Na_2O.y\ SiO_2$, an ion exchange capacity of 138 mmol of $Na^+$/mol of $SiO_2$, corresponding to an $SiO_2:Na_2O$ ratio of 14.5:1, is determined from the figures. Markedly longer reaction times are required if the process is carried out without seed crystals.

| X-ray diffraction pattern | |
|---|---|
| d($10^{-8}$ cm) | I/Io |
| 15.5 | 100 |
| 7.76 | 13 |
| 5.15 | 20 |
| 4.69 | 8 |
| 4.44 | 10 |
| 4.23 | 7 |
| 3.63 | 18 |
| 3.54 | 24 |
| 3.44 | 79 |
| 3.30 | 49 |
| 3.14 | 65 |
| 2.81 | 11 |
| 2.58 | 8 |
| 2.34 | 6 |

| Titration figures | | |
|---|---|---|
| ml of 0.5 M $H_2SO_4$ | pH | mmol of (exchanged) $Na^\oplus$ ions/ 100 g of calcined product |
| 0.00 | 10.59 | 0.0 |
| 1.00 | 9.81 | 25.8 |
| 2.00 | 9.13 | 51.7 |
| 3.00 | 7.28 | 77.5 |
| 4.45 | 6.73 | 115.0 |
| 5.00 | 6.61 | 129.2 |
| 6.00 | 6.54 | 155.0 |
| 7.00 | 6.40 | 180.8 |
| 8.00 | 6.01 | 206.7 |
| 8.50 | 3.97 | 219.6 |
| 9.00 | 2.95 | 232.5 |
| 9.25 | 2.76 | 239.0 |
| 9.50 | 2.65 | 245.4 |
| 9.75 | 2.55 | 251.9 |
| 10.00 | 2.48 | 258.2 |
| 10.50 | 2.34 | 217.7 |
| 11.00 | 2.16 | 297.1 |
| 12.00 | 2.09 | 310.0 |
| 12.50 | 2.03 | 322.9 |
| 13.00 | 1.98 | 355.8 |

The exchange capacity of Na-PSA-2 is approx. 215 mmol of $Na^\oplus$/100 g, relative to calcined material. The filter-moist sodium silicates Na-PSA-1 and Na-PSA-2 were employed in each case for the tests.

The quaternary ammonium compounds used, abbreviated to QAC, are products known per se. The quantity data in the various examples relate in each case to 100% QAC. In using the commercial formulations, account must be taken of the content of active compound in each case.

| QAC-1 | dioctyldimethylammonium chloride |
|---|---|
| | $(n\text{-}C_8H_{12})_2 \overset{\oplus}{N} (CH_3)_2\ Cl^\ominus$ |
| QAC-2 | ditallow-alkyldimethylammonium chloride |
| | $R_2\overset{\oplus}{N}(CH_3)_2\ Cl^\ominus\ R$ = hydrogenated tallow alkyl |
| QAC-3 | coconut-alkyltrimethylammonium chloride |
| | $R\text{—}\overset{\oplus}{N}(CH_3)_3\ Cl^\ominus\ R$ = coconut alkyl |
| QAC-4 | stearyltrimethylammonium chloride |
| | $n\text{-}C_{12}H_{37}\text{—}\overset{\oplus}{N}(CH_3)_3\ Cl^\ominus$ |

These compounds were chosen as examples from the large number of known organic cations. In general, other QACs can also be employed for use according to the invention.

Methyl distearylamine (MDSA) was used as a representative amine component in order to show that the presence of this compound, which acts as a fabric softener, does not have an adverse effect on the adsorption capacity of the phyllosilicic acid which has been modified so as to be organophilic.

| The test parameters: | |
|---|---|
| Temperature: | 60° C. |
| pH: | 10 ± 0.5 |
| Duration: | 30 minutes | were so chosen that they correspond to the conditions in the washing process (60° wash) and simulate these conditions in a model which has deliberately been kept simple. The large amount of fat added is at the upper limit of the fatty soiling of goods to be washed and makes possible a good differentiation in respect of the efficiency of the various systems.

Example 1a

General Instructions

In situ preparation of organophilic phyllosilicic acids (QAC/PSA)

1 l of water is placed in a flask equipped with a stirrer, a thermometer and a reflux condenser and is heated to 60° C.; at this temperature 6.5 g of Na-PSA-1 or 7.5 g of Na-PSA-2 (corresponding to 2.9 g of dry Na-PSA-1 or Na-PSA-2) are added and are dispersed very finely by stirring. The pH is adjusted to a value of 10±0.5 by adding approx. 2.9 g of sodium carbonate ($Na_2CO_3 \cdot 10 H_2O$). The appropriate amount of QAC and, if appropriate, a tertiary amine is then metered in and the mixture is stirred vigorously for 5 minutes. Under these conditions the cation exchange of $Na^+$ for QAC takes place very rapidly until the equilibrium is set up. The QAC/PSA which has been prepared in situ has a different adsorption capacity and organophilic character depending on the C chain length and the amount of QAC which has been exchanged.

Example 1b

Preparation and isolation of QAC/PSA 20.0 g of Na-PSA-1 or 20.0 g of Na-PSA-2 are reacted in a definite ratio with the QAC-1 to -4 at 60° C. and at pH 10±0.5 in 1 l of water (in accordance with the general instructions (Example 1a) (Table 1)). When cation exchange has taken place (30 minutes), the QAC/PSA is isolated by filtration or centrifuging and is dried (80° C. and 100 mm Hg). The layer distance of the QAC/PSA was determined via the X-ray diffraction pattern. All the QAC/PSA samples have undergone a layer enlargement caused by the cation exchange, i.e. incorporation of the QAC. The QAC/PSA systems are accordingly in the organophilic form. The extent of the enlargement depends on the nature of the QAC (Table 1).

TABLE 1

Amounts of 100% QAC employed and layer distances of the dried QAC/PSA

| | — | QAC-1 | QAC-2 | QAC-3 | QAC-4 |
|---|---|---|---|---|---|
| 20.0 g of Na—PSA-1 | — | 4.0 g | 7.6 g | 3.7 g | 4.6 g |
| Layer distance d [Å] | 20.5 | 37 | 55 | 35 | 40 |
| 20.0 g of Na—PSA-2 | — | 5.0 g | 9.5 g | 4.6 g | 5.3 g |
| Layer distance d [Å] | 15.8 | 32 | 52 | 31 | 36 |

Determination of the adsorption capacity in an aqueous dispersion

Example 2a 5.0 ml=4.60 g of sunflower oil are metered, at 60° C. and with stirring, into a dispersion prepared in accordance with Example 1a from 6.5 g of filter-moist Na-PSA-1 (=2.9 g of dry substance) and 1.33 g of QAC-1 in 1 l of water, and the mixture is stirred for 30 minutes at this temperature. During this time the oil on the QAC/PSA is removed from the aqueous emulsion by infiltration between the silicate layers and, in part, by adsorption at the surface. After 30 minutes, the hot dispersion is centrifuged (3000 r.p.m. for 30 minutes), whereupon the QAC/PSA charged with oil is separated off below, while the unadsorbed oil creams up. The liquid phase is decanted off and extracted with three times 100 ml of cyclohexane; the combined extracts are dried over magnesium sulfate, filtered and concentrated. The residue of 0.65 g corresponds to the unadsorbed oil. Accordingly, 3.95 g of oil, corresponding to 86% of the original amount of sunflower oil, was bound.

The same procedure was followed in the examples below. The results are collated in tabular form (Table 2 and 3).

TABLE 2

The fat adsorption capacity of various organophilic phyllosilicic acids of the PSA-1/QAC type

| | Amount employed [g] | | | | | | Sunflower oil absorbed | |
|---|---|---|---|---|---|---|---|---|
| | Na—PSA-1 | | | | | | | |
| Example | 45% strength | QAC-1 | QAC-2 | QAC-3 | QAC-4 | Sunflower oil | g | % |
| 2 b | 6.50 | 1.05 | — | — | — | 4.60 | 4.55 | 99 |
| 2 c | 6.50 | 0.75 | — | — | — | 4.60 | 4.44 | 96 |
| 2 d | 6.50 | 0.52 | — | — | — | 4.60 | 4.14 | 90 |
| 3 a | 6.50 | — | 2.48 | — | — | 4.60 | 0.85 | 18 |
| 3 b | 6.50 | — | 1.98 | — | — | 4.60 | 3.51 | 76 |
| 3 c | 6.50 | — | 1.49 | — | — | 4.60 | 4.59 | 100 |
| 3 d | 6.50 | — | 0.99 | — | — | 4.60 | 4.57 | 99 |
| 4 a | 6.50 | — | — | 1.19 | — | 4.60 | 3.79 | 82 |
| 4 b | 6.50 | — | — | 0.95 | — | 4.60 | 4.58 | 100 |
| 4 c | 6.50 | — | — | 0.71 | — | 4.60 | 4.52 | 98 |
| 4 d | 6.50 | — | — | 0.48 | — | 4.60 | 3.94 | 86 |
| 5 a | 6.50 | — | — | — | 1.51 | 4.60 | 1.17 | 25 |
| 5 b | 6.50 | — | — | — | 1.21 | 4.60 | 4.57 | 99 |
| 5 c | 6.50 | — | — | — | 0.91 | 4.60 | 4.54 | 99 |
| 5 d | 6.50 | — | — | — | 0.60 | 4.60 | 4.26 | 93 |

TABLE 3

The fat absorption capacity of various organophilic phyllosilicic acids of the PSA-2/QAC type

| | Amount employed [g] | | | | | | Sunflower oil absorbed | |
|---|---|---|---|---|---|---|---|---|
| Example | Na—PSA-1 39% strength | QAC-1 | QAC-2 | QAC-3 | QAC-4 | Sunflower oil | g | % |
| 6 a | 7.50 | 1.91 | — | — | — | 4.60 | 3.63 | 75 |
| 6 b | 7.50 | 1.15 | — | — | — | 4.60 | 4.56 | 99 |
| 6 c | 7.50 | 0.76 | — | — | — | 4.60 | 4.49 | 98 |
| 7 a | 7.50 | — | 3.56 | — | — | 4.60 | 0.58 | 13 |
| 7 b | 7.50 | — | 2.14 | — | — | 4.60 | 4.50 | 98 |
| 7 c | 7.50 | — | 1.42 | — | — | 4.60 | 4.54 | 99 |
| 8 a | 7.50 | — | — | 1.70 | — | 4.60 | 1.15 | 25 |
| 8 b | 7.50 | — | — | 1.02 | — | 4.60 | 4.57 | 99 |
| 8 c | 7.50 | — | — | 0.68 | — | 4.60 | 4.56 | 99 |
| 9 a | 7.50 | — | — | — | 2.17 | 4.60 | 0.70 | 15 |
| 9 b | 7.50 | — | — | — | 1.30 | ·4.60 | 4.59 | 100 |
| 9 c | 7.50 | — | — | — | 0.87 | 4.60 | 4.55 | 99 |

Example 10

6.5 g of Na-PSA-1 are reacted with 1.33 g of QAC-1 in accordance with Example 2a, but, differently from Example 2a, 5.0 ml=4.60 g of sunflower oil and 2.0 g of methyldistearylamine (MDSA) are added to the mixture, which, after being stirred for 30 minutes at 60° C., is worked up as described. The residue amounted to 2.38 g. The content of MDSA was determined by titrating the residue with 0.1N $HClO_4$.

| | |
|---|---|
| Sunflower oil in the residue | 1.71 g |
| MDSA in the residue | 0.67 g |
| Amount of oil adsorbed | 2.89 g = 63% |
| MDSA adsorbed | 1.33 g = 67% |

Example 11

6.5 g of Na-PSA-1 and 0.71 g of QAC-3 are reacted analogously to Example 2a. 5.0 ml=4.60 g of sunflower oil and 2.00 g of MDSA are then metered in at 60° C., and the mixture is stirred at this temperature for 30 minutes. It is worked up in accordance with Example 2a. The residue obtained was 0.08 g, composed of 0.02 g of MDSA and 0.06 g of sunflower oil.

| | |
|---|---|
| Amount of oil adsorbed | 4.56 g = 99% |
| MDSA adsorbed | 1.98 g = 99% |

Example 12

7.5 g of Na-PSA-2 are reacted with 1.91 g of QAC-1 as described in Example 2a to give the organophilic phyllosilicate. 5.0 ml=4.60 g of sunflower oil and 2.0 g of MDSA are then metered in at 60° C., and the mixture is stirred for 30 minutes and worked up in the customary manner. The residue amounted to 3.46 g, composed of 2.42 g of sunflower oil and 1.04 g of MDSA.

| | |
|---|---|
| Amount of oil adsorbed | 2.18 g = 47% |
| MDSA adsorbed | 0.96 g = 48% |

Blank tests with Na-PSA-1 and Na-PSA-2

6.5 g of Na-PSA-1 or 7.5 g of Na-PSA-2 are dispersed in 1 l of water at 60° C. by stirring, the pH is adjusted to a value of 10±0.5 by adding 2.9 g of sodium carbonate, and 5.0 ml=4.60 g of sunflower oil are then metered in.

After 30 minutes the mixture is worked up as in Example 2a.

When Na-PSA-1 was employed, the residue amounted to 3.65 g of oil (=79%), and when Na-PSA-2 was employed, the residue amounted to 3.77 g of oil (=82%).

The losses of sunflower oil caused by the process through adsorption to the walls of the vessels and the specific adsorption of the phyllosilicic acids are shown in the difference from 100%.

The content of hydrolyzed oil in the sunflower oil extracted (=residue) was determined by titration. Less than 5%, as a rule less than 1%, of the sunflower oil are hydrolyzed during the course of the procedure used.

Conclusion:

Organophilic phyllosilicic acids are capable, in accordance with the invention, of adsorbing organic compounds—in particular triglycerides—rapidly and quantitatively from an aqueous liquor. This property is retained to a very great extent even in the presence of a softener amine, such as MDSA. The organophilic phyllosilicic acids claimed as therefore excellently suitable for use as additives for enhancing the washing action in detergents or as a depot for organic compounds.

We claim:

1. An adsorbent for organic compounds which is based on phyllosilicic acids modified so as to be organophilic and which is prepared from the components comprising
   (a) 5–80%, of a quaternary ammonium compound of the formulae I–IV

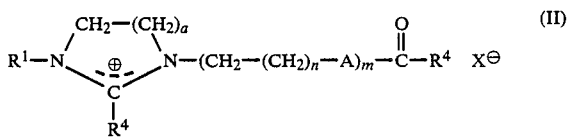

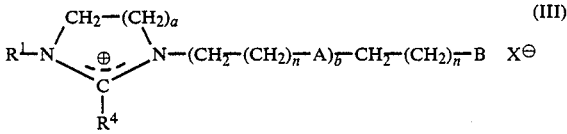

-continued

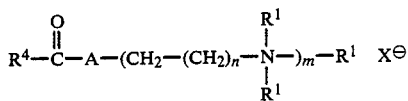  (IV)

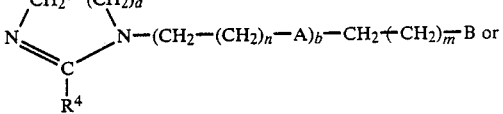

$$R^4-CO-A-(CH_2-(CH_2)_n)_m-NH_2$$

in which $R^1$ and $R^2$ can be identical or different and denote hydrogen, $C_1-C_4$-alkyl, $C_2-C_4$-hydroxyalkyl or benzyl, $R^3$ denotes hydrogen, $C_1-C_{22}$-alkyl or $C_2-C_{22}$-alkenyl, $C_2$ $C_4$-hydroxyalkyl or benzyl, $R^4$ denotes $C_1-C_{22}$-alkyl, $C_6-C_{22}$-alkenyl, $C_4-C_{22}$-alkoxyalkyl or $C_4-C_{22}$-alkylphenoxyethyl, a denotes 1 or 2, b denotes a number from 0 to 3, n or m denote a number from 1 to 4, A denotes NH or 0, B denotes $NH_2$, $N(R^1)_2$, $N^{\oplus}(R^1)_3^{\ominus}$ or OH and $X^{\ominus}$ denotes an anion, and (b) 20-95%, of a crystalline phyllosilicate belonging to the group comprising phyllosilicates of the formula

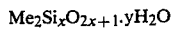

in which Me denotes an alkali metal ion or a proton, x denotes a number greater than 7, and y denotes a number smaller than 7 x.

2. A process for the preparation of an adsorbent as claimed in claim 1, which comprises reacting the crystalline phyllosilicates in the form of alkali metal phyllosilicates with quaternary ammonium compounds of the formulae indicated in claim 1.

3. The process for the preparation of an adsorbent as claimed in claim 1 in the event that $R^1$=hydrogen, wherein the crystalline phyllosilicates are reacted in the form of free phyllosilicic acids with amines of the formulae

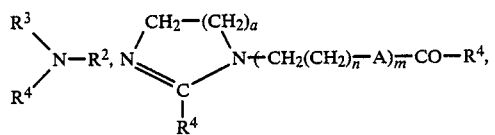

in which $R^2$, $R^3$, $R^4$, a, n and m have the meanings indicated in claim 1.

4. An adsorbent as claimed in claim 1, wherein said component (a) comprises 10-50% of said quaternary ammonium compound of formulae I-IV.

5. An adsorbent as claimed in claim 1, wherein:
$R^3$ is $C_6-C_{22}$-alkyl or $C_6-C_{22}$-alkenyl, and
$R^4$ is $C_6-C_{22}$-alkyl.

6. An adsorbent as claimed in claim 1, wherein said component (b) comprises 50-90% of said cyrstalline phyllosilicate, and wherein x denotes a number from 7.5 to 23.

7. An adsorbent as claimed in claim 1, which is prepared from the components comprising:
(a) 10-50% of said quaternary ammonium compound of formulae I-IV, and, in formula I-IV, $R^3$ denotes $C_6-C_{22}$ alkyl or $C_6-C_{22}$ alkenyl, and $R^4$ denotes $C_6-C_{22}$-alkyl; and
(b) 50-90% of said crystalline phyllosilicate of said formula, wherein x denotes a number from 7.5 to 23.

8. A process as claimed in claim 2, wherein said adsorbent is prepared from the components comprising:
(a) 10-50% of said quaternary ammonium compound of formulae I-IV, and, in formula I-IV, $R^3$ denotes $C_6-C_{22}$ alkyl or $C_6-C_{22}$ alkenyl, and $R^4$ denotes $C_6-C_{22}$-alkyl; and
(b) 50-90% of said crystalline phyllosilicate of said formula, wherein x denotes a number from 7.5 to 23.

9. A process as claimed in claim 3, wherein said adsorbent is prepared from the components comprising:
(a) 10-50% of said quaternary ammonium compound of formulae I-IV, and, in formula I-IV, $R^3$ denotes $C_6-C_{22}$ alkyl or $C_6-C_{22}$ alkenyl, and $R^4$ denotes $C_6-C_{22}$-alkyl; and
(b) 50-90% of said crystalline phyllosilicate of said formula, wherein x denotes a number from 7.5 to 23.

* * * * *